Patented Aug. 5, 1941

2,251,536

UNITED STATES PATENT OFFICE 2,251,536

METHOD OF MANUFACTURING DETERGENT, WETTING-OUT, AND EMULSIFYING AGENTS

Eitaro Watanabe, Chiba Ken, and Shuji Kawamura, Tokyo, Japan, assignors to Miyoshi Kagakukogyo Kabushiki Kaisha, Tokyo, Japan, a corporation of Japan No Drawing. Application February 7, 1939, Serial No. 255,050

4 Claims. (Cl. 260—512)

The present invention relates to a method of manufacturing a detergent, wetting-out and emulsifying agent, which consists in adding chloride or sulphate of ammonium as a catalyst to a mixture of phenols, for example, phenol and cresol, and an aliphatic alcohol having more than six carbon atoms, heating the mixture and mixing the thus-obtained reaction product with a sulphonation agent such as sulphuric acid or chlor-sulphonic acid in quantity two or three times greater than 100% sulphuric acid, that is a sulphonation agent calculated to 100% $H_2SO_4$ is added to the initial material, phenol ether, the quantity of said sulphonation agent being two to three times greater than that of the initial material and sulphonating the same, maintaining the temperature below 25° C. The object thereof is to obtain by a very simple means a stable acid-proof, and hard water-proof product having excellent detergent, cleansing, wetting-out and emulsifying power and dispersing property and producing no scum with soap.

According to the present invention, a neutral salt of a strong acid such as ammonium chloride, ammonium sulphate, etc., is added as a catalyst to phenols such as phenol, cresol, etc., and by mixing the same with an aliphatic alcohol and heating the mixture a kind of compound is produced. Next, adding to the compound a sulphonation agent such as strong sulphuric acid or chlor-sulphonic acid calculated to 100% $H_2SO_4$, the quantity of said sulphonation agent being two to three times greater than the compound, and treating the same at a temperature below 25° C., there is obtained a stable acid-proof, and hard water-proof product producing no precipitate even with calcium chloride and free from the liability of becoming turbid with soap and having excellent detergent, wetting-out cleansing, emulsifying and dispersing power.

It is already known that in order to condense higher aliphatic alcohols and phenols a large quantity of metallic chloride having a dehydrating action such as zinc chloride, ferric chloride, magnesium chloride, etc., is added and heated to react and then by refining the reaction product and removing metallic salt and further sulphonating the above reaction product detergent and dispersing agents are manufactured. If on this occasion there remains even the slightest quantity of the added metallic compound in the product, the product forms a large quantity of the soap scum which is insoluble in water when used with soap to treat fibrous goods, thus producing spots or stains on the goods to be treated. This necessitates the complete removal of the metallic compound previously before the sulphonation. It may be done by distillation under high vacuum, but it is very troublesome and expensive with the consequent increase in the cost of the production. Further, there is a process employing acetic anhydride, sulphuric acid or an acidic salt, etc., as a dehydrating agent in manufacturing the so-called alkyl phenol by combining phenol with alcohol. But it colors the reaction product considerably and consequently renders the refining difficult. If these alkyl phenols are sulphonated by a small quantity of a sulphonation agent at a relatively high temperature as by the known process, the product inevitably has insufficient detergency and wetting-out. This invention differs from the above known process mainly in the following respects. In condensing phenols and higher aliphatic alcohols, a neutral salt of alkali metal or ammonium is added, and the reaction is caused by heating in the absence of air by removing air from the reaction zone.

Next, the thus-obtained product is mixed with a sulphonation agent such as sulphuric acid, chlor-sulphonic acid, etc. calculated to 100% $H_2SO_4$, the quantity of said sulfonation agent being two to three times greater than the product with which it is mixed, maintaining the said product at a low temperature below 25° C. and thus the above defect is obviated. However, the intermediate product of this invention, viz. the reaction product of phenols and high class alcohol of fatty series is entirely different in constitution and property from the known

(R denotes alkyl radicle) produced by adding a substantially equal quantity of a dehydrating agent like zinc chloride to phenols and condensing the same by heating it with higher alcohol of fatty series. The following are the main different points:

1. Test samples.

(a—1). Obtained according to the present invention by adding 1 mol. of phenol and 5% of ammonium sulphate as a catalyst to 1 mol. of an aliphatic alcohol consisting of 35% of cetyl alcohol and 65% of oleyl alcohol and causing them to react by heating at 160–170° C. for 16 hours.

(a—2). Obtained by employing cresol instead of phenol in (a—1), the other conditions being the same.

(b—1). Obtained by the known process by adding 100 parts of phenol and 100 parts of anhydrous zinc chloride as a dehydrating agent to 100 parts of an aliphatic alcohol consisting of 35% of cetyl alcohol and 65% of oleyl alcohol, causing them to react by heating at 160–170° C. for 16 hours, precipitating and separating zinc chloride by keeping the mixture still, and after washing the same with water, distilling it under vacuum and distilling out at 190–225° C. under the pressure of 4 mm.

(b—2). Obtained by employing cresol in place of phenol in (b—1), the other conditions being the same.

2. Test of the iodine value, hydroxyl value and specific viscosity.

| | Iodine value | Hydroxyl value | Specific viscosity (second, redwood viscosimeter at 27° C.) |
|---|---|---|---|
| (a–1) | 123.1 | 295 | 89 |
| (a–2) | 125.6 | 152 | 85 |
| (b–1) | 88.5 | 183 | 1956 |
| (b–2) | 104.2 | 117 | 1912 |
| Product obtained by adding hot water of the quantity 2.5 times greater to (a–1), boiling it for 30 minutes and washing it | 66.7 | 310 | |
| Product obtained by adding 5% caustic potash solution of the quantity 2.5 times greater to (a–1), boiling the mixture for 30 minutes and then washing it | 60.4 | 393 | |
| Product obtained by adding 5% sulphuric acid of the quantity 2.5 times greater to (a–1), boiling the mixture for 30 minutes and washing it | 66.1 | 350 | |
| Product obtained by adding hot water of the quantity 2.5 times greater to (b–1) and boiling and washing the same | 88.5 | 183 | |
| Product obtained by adding 5% caustic potash solution of the quantity 2.5 times greater to (b–1), boiling the mixture for 30 minutes and washing it | 80.9 | 181 | |
| Product obtained by adding 5% sulphuric acid of the quantity 2.5 times greater to (b–1), boiling the mixture for 30 minutes and washing it | 73.5 | 364 | |

3. Test of the resistance to water, dilute caustic potash and dilute sulphuric acid.

Adding hot water, 5% caustic potash solution and 5% sulphuric acid, each in the quantity 2.5 times greater to the test samples, they were boiled for 30 minutes and their loss due to the solution was examined.

| | (a—1) | (b—1) |
|---|---|---|
| | Percent | |
| Hot water | 27 | None. |
| 5% caustic potash solution | 27 | Do. |
| 5% sulphuric acid solution | 27 | Do. |

As shown above, the reaction product of the phenols and higher alcohol of fatty series obtained as an intermediate product in the present invention is considerably different in iodine value, hydroxyl value and viscosity from the known product obtained by heating and condensation in the presence of a large quantity of a dehydrating agent, the former being unstable against hot water, alkali and acid, whereas the latter is very stable and especially is highly acid-proof. Moreover, in sulphonation the former has low viscosity and disperses homogeneously even if mixed with 100% sulphuric acid of the quantity more than three times greater and is not separated even if held at a low temperature below 25° C. and may have the sulphonation reaction proceed smoothly, whereas the latter is separated in the form of a layer if cooled at 25° C. with the addition of more than an equal quantity of 100° sulphuric acid, and consequently in the presence of a large quantity of sulphuric acid cannot be sulphonated at a low temperature.

In this invention, if the reaction product of alcohol and phenol is utilized, there is no necessity of using a large quantity of chloride of zinc, iron or magnesium, free sulphuric acid, free acetic acid or acidic salt as a dehydrating agent, but only a small quantity of a catalyst is sufficient. The said catalyst gives no bad effect whatever upon the property of the product after sulphonation even if it stays in the intermediate product, nor does it color the product if the reaction is allowed to proceed in the absence of air, passing carbonic acid gas and other inert gases or preventing contact with air. Further, if the thus-obtained reaction product of alcohol and phenol is treated with a sulphonation agent of the quantity two or three times greater (as 100% sulphuric acid) while being maintained at a low temperature below 25° C., the product will possess far more excellent detergent, wetting-out and emulsifying power and dispersing property than the known sulphonation product of alkylphenol, although it is only slightly inferior to the latter in acid-proofing. It may be attributed to the difference in the condition of the combination of alcohol and phenol radicle and that of sulphuric acid.

The following are a few examples of performing the present invention:

*Example I*

Mix 25 parts of phenol with 5 parts of ammonium sulphate as a catalyser and heat the mixture at 160° C. in the atmosphere of inert gas after the addition of 75 parts of oleyl alcohol, passing carbonic acid gas through it. Next, holding the thus-obtained reaction product below 15° C., pour sulphuric acid of 66° Baumé of the quantity three times greater. Thus, sulphonate and convert it into a water soluble compound.

*Example II*

Mix 30 parts of cresol with 70 parts of cetyl alcohol and 5 parts of ammonium sulphate. Next, passing the mixture through a narrow pipe and preventing contact with air, heat the same at 160° C. to react and then effect sulphonation according to the preceding example.

It is claimed:

1. Method of manufacturing a detergent, wetting-out, and emulsifying agent, which consists in mixing phenols with monohydric higher alkyl alcohols having more than 6 atoms of carbon, heating the mixture with the addition of an ammonium salt as a catalyser so as to combine the phenols with the monohydric higher alkyl alcohol and causing the thus-obtained product to react with a sulphonation agent, maintaining it at a temperature below 25° C., and thus converting the same into a sulphonated compound.

2. Method of manufacturing a detergent, wetting-out and emulsifying agent, which consists in adding monohydric higher alkyl alcohols having more than 6 atoms of carbon and ammonium sulphate as catalyser to phenols and heating the mixture, cutting off its contact with air by sucking out air, thereby combining the phenols with the monohydric higher alkyl alcohols, and causing the thus-obtained product to react with a sulphonation agent, maintaining it at a temperature below 25° C., and thus converting the same into a sulphonated compound.

3. Method of manufacturing a detergent, wetting-out and emulsifying agent, which consists in adding monohydric higher alkyl alcohols having more than 6 atoms of carbon and ammonium sulphate as catalyser to phenols and heating the mixture, passing inert gas through it, thus combining the phenols with the monohydric higher alkyl alcohols, and causing the thus-obtained product to react with a sulphonation agent, maintaining it at a temperature below 25° C., and thus converting the same into a sulphonated compound.

4. Method of manufacturing a detergent, wetting-out and emulsifying agent, which consists in adding monohydric higher alkyl alcohols having more than 6 atoms of carbon and ammonium sulphate as catalyser to phenols, heating the mixture to combine the phenols with the monohydric higher alkyl alcohols, adding to the thus-obtained product a sulphonation agent of 2–3 times greater weight, converted into the quantity equivalent to 100% sulphuric acid, causing them to react at a temperature below 25° C. and thus converting said product into a sulphonated compound.

EITARO WATANABE.
SHUJI KAWAMURA.